United States Patent [19]

DePauw et al.

[11] 4,348,855

[45] Sep. 14, 1982

[54] CROP DAMAGE RESPONSIVE CONTROL OF ROTOR SPEED

[75] Inventors: Richard A. DePauw, East Moline; Richard W. Staiert, Geneseo, both of Ill.

[73] Assignee: International Harvester Company, Chicago, Ill.

[21] Appl. No.: 189,238

[22] Filed: Sep. 22, 1980

[51] Int. Cl.³ .............................................. A01F 12/00
[52] U.S. Cl. .............................. 56/10.2; 56/DIG. 15; 130/27 R
[58] Field of Search ......................... 56/10.2, DIG. 15; 130/27 T, 27 H, 27 HA

[56] References Cited

U.S. PATENT DOCUMENTS 3,935,866 2/1976 Northup et al. .............. 56/DIG. 15
3,939,846 2/1976 Drozhzhw et al. ........... 56/DIG. 15
4,004,289 1/1977 Kirk .............................. 56/DIG. 15
4,259,829 4/1981 Strubbe ......................... 56/DIG. 15

Primary Examiner—Robert A. Hafer
Attorney, Agent, or Firm—Neal C. Johnson; F. David AuBuchon

[57] ABSTRACT

A self-propelled crop harvesting combine having a variable speed crop threshing and separating rotor. The crop material is delivered from a conventional cleaning system into a grain holding tank. A system is provided to determine the ratio of damaged to undamaged grain from predetermined amounts of grain delivered to the grain tank. An electronic control system varies the speed of the rotor in response to changes in the ratio whereby the speed of the threshing mechanism is automatically varied to minimize grain damage in the threshing process.

15 Claims, 4 Drawing Figures

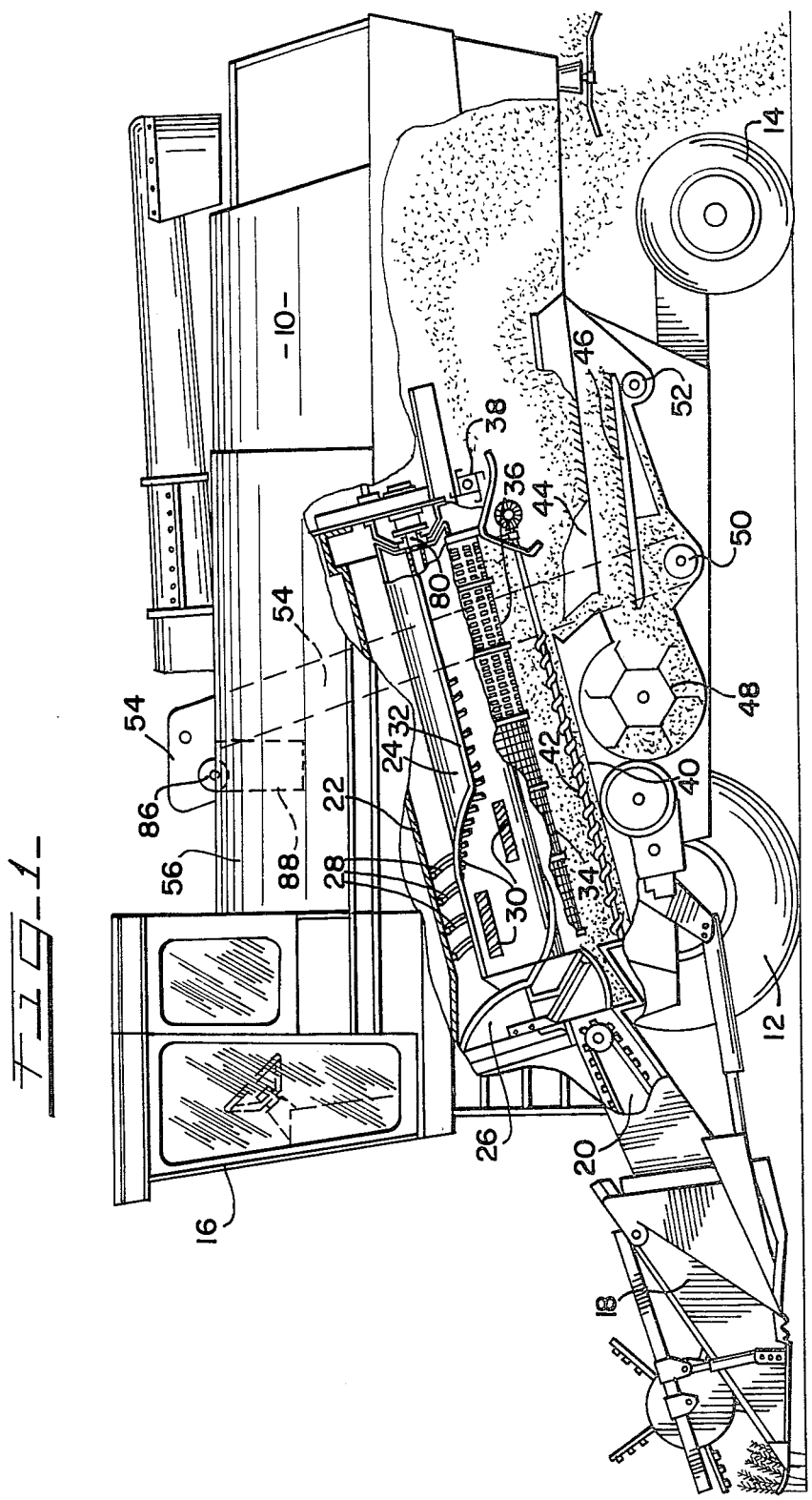

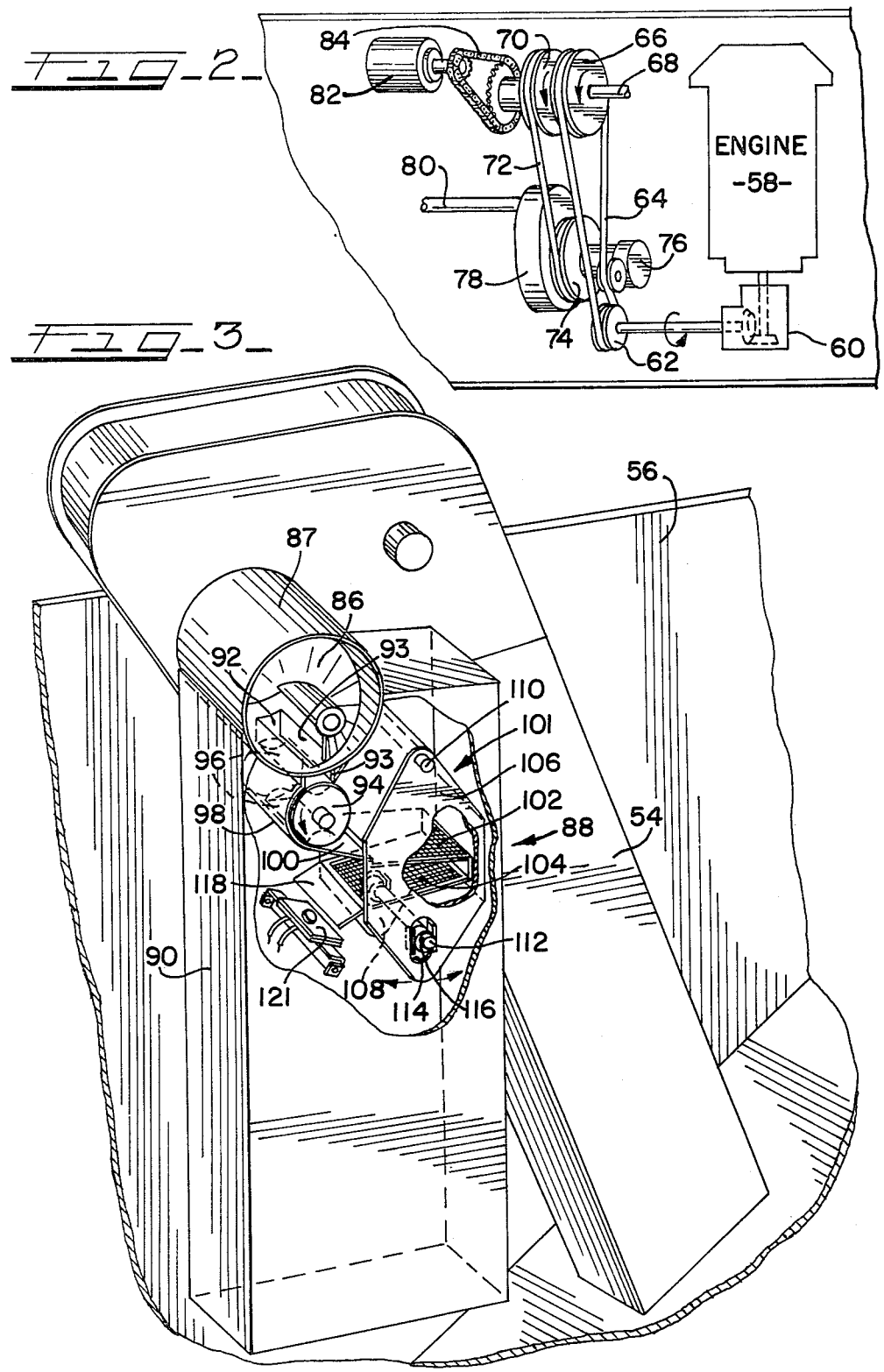

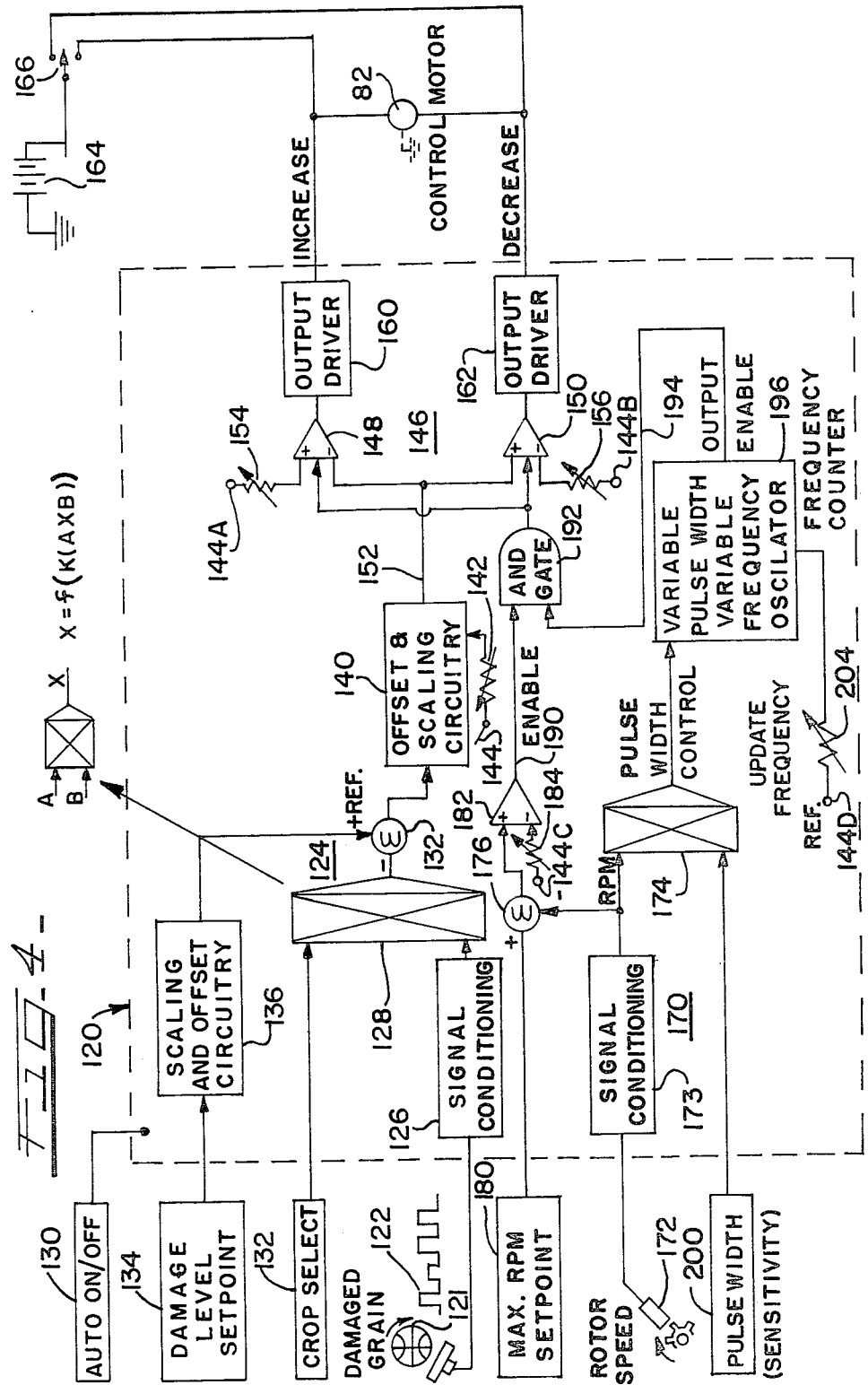

CROP DAMAGE RESPONSIVE CONTROL OF ROTOR SPEED

BACKGROUND OF THE INVENTION

1. Field of the Invention

The invention relates generally to crop harvesting combines and more particularly to a system for controlling the crop threshing mechanism to minimize crop damage within the threshing mechanism.

2. Prior Art

Applicants are unaware of any prior art which controls the speed of a crop threshing and separating mechanism in response to sensing a ratio of damaged to undamaged grain as processed in the threshing and separating mechanism. It is old to effect the control of the speed of a crop harvesting cylinder as in U.S. Pat. Nos. 3,609,947; 3,910,286; 3,897,677; and 3,606,742. In the above '286 patent, cylinder speed is sensed and a "control means 29" (shown as a square in FIG. 2) may stop the cylinder, lift the table, or stop the machine. In above patent '677 the angle of the feeder is sensed as indicative of possible jamming of the threshing cylinder and a warning is given or a "control" effected. As in above patent '286 the "control means 29" is not further defined or described. In any case, neither patent is concerned with crop damage responsive controls. Above patent '947 likewise has no relation to crop damage and controls responsive thereto.

The standard practice of determining grain damage is by visual inspection or taking a sample to a facility wherein dockage checks are made to determine the amount of grain damage. The combine operator then adjusts the machine with the hope that the new operating parameters will minimize crop damage while maintaining reasonable harvesting rates. In making such adjustments the operator would be concerned with maintaining relatively high threshing rotor speeds since less power is required to thresh and move crop through a rotor at higher rotor speeds. Variations in crop type, toughness, and moisture content are also variables to be taken into account. At best, under current practice the operator is using an educated guess as to optimum rotor speeds for minimal crop damage.

SUMMARY OF THE INVENTION

The invention provides a crop threshing system which is automatically controllable in response to sensing grain damage from the threshing process with the ultimate goal of minimizing grain damage while optimizing crop harvesting rates.

It is a primary object of the invention to provide a crop threshing system which minimizes grain damage.

A further object commensurate with the object above is to maximize the harvesting rate.

A further object is to eliminate considerations of crop variety, moisture content, toughness, crop density in the field, by assessing grain damage continuously during harvesting.

Another object is to minimize the power consumption by operating the threshing rotor at the maximum speeds compatible with acceptable grain damage levels.

A still further object of the invention is to eliminate guess work inherent in adjusting rotor speeds as a result of visually inspecting the crop for damage or having dockage checks made.

BRIEF DESCRIPTION OF DRAWINGS

FIG. 1 is a side elevation view partly in section, showing a crop harvesting unit;

FIG. 2 is a fragmentary perspective view of a drive component of the harvesting unit;

FIG. 3 is a fragmentary perspective view of the damaged kernel sensing mechanism; and, FIG. 4 is an electrical schematic of the control circuit constructed in accordance with the present invention.

DESCRIPTION OF THE PREFERRED EMBODIMENT

While this invention is susceptible of embodiment in many different forms, there is shown in the drawing and will herein be described in detail a preferred embodiment of the invention with the understanding that the present disclosure is to be considered as an exemplification of the principle of the invention and is not intended to limit the invention to the embodiment illustrated.

Referring first to FIG. 1 there is shown an axial flow combine of the general type marketed by the assignee herein under model designation 1440, 1460 and 1480. The combine includes a body 10 supported on front drive wheels 12 and steerable rear wheels 14. The combine is powered by an engine and controlled from an operator's control center 16. A crop harvesting header 18 cuts the crop and conveys it to a feeder 20 which feeds the crop material into an axial threshing and separating unit including a generally cylindrical casing 22 and a generally cylindrical rotor 24 mounted therein. The rotor 24 is driven from the engine and includes a front mounted impeller 26 which imparts rearward movement to the crop material received from the feeder 20. High speed rotation of the rotor 24 together with spiral vanes 28 on the upper inner surface of the casing 22 impel the material rearwardly in a generally helical direction about the rotor.

A plurality of rasp bars 30 and transport bars 32 mounted on the rotor 24 cooperate respectively with a semicylindrical concave 34 and a semi-cylindrical grate 36 to thresh the crop material such that most of the grain will be separated and impelled outwardly through the concave and grate. The straw and other waste material is impelled rearwardly out of the casing 22 where a rotary beater 38 throws the straw rearwardly from the machine. Most of the grain drops onto a grain pan 40 where it is conveyed rearwardly by a plurality of augers 42 for the subsequent cleaning and collection.

The combine includes a system for cleaning chaff and foreign matter, or tailings etc. from the grain. This system includes a chaffer sieve 44, a grain sieve 46, a cleaning fan 48, a clean grain auger 50, and a tailings auger 52. The chaffer sieve 44 is supported for for-and-aft reciprocation or oscillation so that grain and tailings received from the augers 42 and grate 36 will be passed to the grain sieve 46. The grain sieve 46 is mounted for reciprocation to separate the grain from the tailings so that the grain passes through the sieve and onto the clean grain auger 50 while the tailings are moved rearwardly onto the tailings auger 52. The cleaning fan 48 creates an air flow upwardly and rearwardly through both sieves to carry away chaff. The clean grain collected by the auger 50 is delivered through an elevator 54 to a grain tank 56 of the combine.

The rotor 24 is driven through a system shown schematically in FIG. 2, portions of which are shown in detail in U.S. Pat. Nos. 4,160,456 and 4,173,155 issued to the assignee herein. An engine 58 powers the combine and drives the rotor 24. Output from the engine 58 is transmitted through a gearbox 60 to a first belt drive unit comprising a sheave 62, a belt 64 and a sheave 66 which is mounted on a jackshaft 68. A second belt drive unit includes a variable diameter sheave 70 mounted on the jackshaft 68, a belt 72, and a variable sheave 74 of a torque sensing unit 76. Drive from the torque sensing unit 76 is transmitted to a two speed gearbox 78 which has an output shaft 80 coupled to the rotor 24.

The speed of the rotor 24 is variable by means including an electric motor 82 operable through a chain and sprocket drive 84 to change the effective diameter of the variable sheave 70. Driving the motor 82 in one direction increases the effective diameter of the sheave 70 to increase the rotor speed and driving the motor 82 in the opposite direction decreases the diameter of the sheave 70 to decrease the speed of the rotor.

As shown in FIG. 3, the grain elevator 54 includes a discharge auger 86 operative within a tube 87 to deliver grain into the grain tank 56 of the combine. In accordance with the invention, an assembly 88 for determining grain damage is mounted adjacent to the elevator 54 within the grain tank 56. The assembly 88 includes an open-bottom housing 90. A rectangular, material-inlet opening 92 is defined through the auger tube 87 and communicates with a tube section 93 extending downwardly therefrom. Journalled beneath the tube section 93 within the housing 90 is a rotatable metering drum 94 having a pair of diametrically opposed pockets 96 defined in the periphery thereof. A housing 98 is joined to one side of the tube section 93 and extends downwardly around a portion of the periphery of the metering drum 94 and terminates in a ramp section 100 angled downwardly beneath the drum 94.

Also disposed within the housing 90 is a material classification unit 101 including a first sieve 102 and a second sieve 104. These sieves are fastened between a pair of wall structures 106 and 108 forming a unitary structure pivotally mounted on a rod 110 fixed in the housing 90. The classification unit 101 can be oscillated about the rod 110. A driven shaft 112 extends into the housing 90 and projects through openings 114 defined coaxially through each of the wall structures 106 and 108 beneath the sieve 104. A cam element 116 is secured on the shaft 112 within each opening 114 to engage the periphery of the opening in such a way that rotation of the shaft oscillates the unit 101 about the rod 110. A discharge ramp 118 is angled downwardly from the sieve 104 for directing crop material onto a transducer plate 121 mounted within the housing 90 and forming a part of an electronic control system to be described. It will be understood that the metering drum 94 and shaft 112 are power driven by means (not shown) disposed outside the grain tank 56.

The operation of the assembly 88 will now be described. The auger 86 delivers the grain through the tube 87 into the grain tank 56. A portion of the grain falls into the tube section 93 which retains the grain above the metering drum 94. The drum 94 is rotated at constant speed and the pockets 96 successively convey a fixed amount of grain onto the ramp 100 and onto the sieve 102. The sieve 102 has openings therethrough of a size to retain whole, i.e., undamaged kernels, heads, or seeds of the crop material and permits the smaller cracked or damaged grain and fines to fall therethrough onto the sieve 104. The oscillation of the unit 101 and the angle of the sieve 102 causes the undamaged grain to move off the right end of the sieve (as viewed in FIG. 3) and into the grain tank 56 through the open-bottom housing 90. Sieve 104 is sized to collect the cracked or damaged grain and permit the chaff and fines to fall therethrough into the grain tank. The oscillation of the unit 101 and the angle of the sieve 104 causes the damaged grain to move onto the ramp 118 which directs the material to impact against the transducer 121.

The invention includes an electronic control system for controlling the speed of rotation of the crop threshing and separating rotor 24 in response to the amount of damaged grain impacting on the transducer 121. The speed of the rotor is automatically increased and decreased as a function of the amount of damaged grain by the electronic control circuitry which will now be described.

Basically, the function of the electronic control circuitry, generally labeled 120, of FIG. 4 is to provide control signals dependent on the amount of damaged grain kernels sensed within a period of time. Accordingly, the electronic control circuitry 120 provides output signals dependent on whether the amount of damaged grain kernels are within a selected range; that is, whether the amount or level of the damaged kernels is higher or lower than a maximum tolerable limit. The signals from circuitry 120 are then applied as control signals to the motor 82 which controls the variable speed crop threshing and separating rotor 24, see also FIG. 1.

The electronic control circuitry 120 will now be described in more detail. Referring to the input or left side of FIG. 4, "damaged-grain" transducer 121, which may be of any suitable known construction, senses the kernels of grain to provide a train of output pulses, as at 122, representative of the sensed kernels. An automatic on/off switch 130 is provided for the circuitry 120. A difference or error signal determining subcircuit 124 includes a discriminator and signal conditioner 126, of any suitable known type, which selects those pulses which correspond to damaged kernels of grain. Discriminator 126 provides an output signal proportional to the number of damaged kernels of grain sensed per a given unit of time as one input to a multiplier circuit 128 which may be of any suitable known design. A crop select unit 132 provides a pre-established reference signal representative of the crop type being processed to multiplier circuit 128. Multiplier 128 in turn generates the following output function:

$$X = f[k(A \times B)]$$

where
 A represents the reference signal representative of the type of crop;
 B represents the signal from discriminator 126;
 f is the function symbol; and,
 k represents a constant.

The output from the multiplier 128 is coupled to summing circuitry 132 of conventional design. A second input to summing circuitry 132 is the damage setpoint level signal representative of the amount or level of damaged kernels that can be tolerated within a selected time period, which signal is obtained from the damage level setpoint unit 134. The damage level setpoint signal is coupled through a scaling and offset circuitry 136 to summing circuitry 132.

The number of damaged kernels sensed per unit of time are thus compared to the composite reference signal comprising the crop type reference signal and the damage level setpoint, both of which are selected by the operator. Basically, the crop type signal operates on the damage level setpoint to correct the latter for characteristic damaged kernel signal levels. Circuit-wise, the summing circuitry 132 combines the signal from multiplier 128 and the damage level signal from unit 134 to provide a difference or error signal as follows:

$$CRS - DKS = DS$$

where
CRS represents the composite reference signal;
DKS represents the damaged kernel signal; and,
DS represents the difference or error signal.

The difference or error signal produced by the foregoing summation is then amplified and offset in amplifier 140. A sensitivity control for amplifier 140, depicted generally as variable resistor 142 is provided between a reference source 144 and amplifier 140 to effect manual or automatic compensation of sensitivity, as is known.

The difference or error signal from subcircuit 124 provides an input to a balanced comparator 146 comprising a pair of operational amplifiers (op amps) 148 and 150. More specifically, the output of summing circuitry 132 is coupled through amplifier 140 and lead 152, as an input to the inverting input terminal of op amp 148, and in parallel as an input to the non-inverting input terminal of operational amplifier 150. A first or high threshold level reference voltage is coupled from a reference source indicated as 144A through a variable resistor 154 to the non-inverting input terminal of operational amplifier 148. A second or low threshold reference voltage is coupled from a reference source indicated as 144B through variable resistor 156 to the inverting input terminal of operational amplifier 150. A third or control input is provided to each of the operational amplifiers 148 and 150 indicative of other parameters which will be described hereinbelow.

Assuming for the moment that an enabling signal is present at the input of operational amplifiers 148 and 150, and also that an error or difference signal has been received by operational amplifiers 148 and 150. Under this condition, the output from comparator 146 then controls the appropriate output driver circuit 160 or 162 to vary the direction of rotation of the control motor 82 which then varies the rotor rpm.

A conventional battery 164 is selectively coupled through a two-position switch 166 to electrically opposite sides of motor 82.

The output drivers 160 and 162 provide the necessary power amplification and transient circuit protection against high voltage spikes, short circuits, and so forth. In the embodiment of FIG. 4, the motor 82 is a double winding reversible DC type. However, a single winding reversible D.C. motor could be used by substitution of a double pole switch appropriately wired for switch 166 and by modifying drivers 160 and 162 to provide for complementary drive necessary for polarity reversal of the output control conductors.

Refer again to the input (left hand side of FIG. 4) of the circuitry 120 to initiate the discussion of the control enabling subcircuit 170. A rotor RPM sensor, indicated at 172, couples a signal through a conditioning circuit 173 representative of the rotor RPM to a multiplier 174. The same signal is also coupled to a summing circuit 176. A second and reference input to summing circuit 176 is coupled from a reference unit 180 of any suitable known construction which establishes the maximum RPM setpoint. Summing circuit 176 provides an error signal similar to that set forth above with reference to summing circuit 124. Summing circuit 176 provides an error signal representative of the difference between the maximum RPM setpoint and the actual rotor RPM.

The error signal from summing circuit 176 is coupled to the non-inverting terminal of an operational amplifier 182 which functions as a single side comparator. A voltage from reference input indicated as 144C is coupled through a variable resistor 184 as the second input to operational amplifier 182. When the summing circuit 176 provides a difference or error signal indicating that the rotor speed, as sensed by sensor 172, is less than the maximum RPM set by unit 180, the difference signal from summing circuit 176 will cause operational amplifier 182 to be enabled. Conversely when the summing circuit 176 provides a difference signal indicating that the rotor speed, as sensed by sensor 172, is greater than the maximum RPM set by unit 180, the difference or error signal from summing circuit will cause operational amplifier 182 to be disabled.

The enabling signal from operational amplifier 182 is coupled as one input 190 to And gate 192. The other input 194 to And gate 192 is received from a variable pulse width, variable frequency oscillator 196.

Referring once again to the input side of the circuitry of FIG. 4, a selectable pulse width sensitivity control 200 provides a signal to multiplier 174. Multiplier 174 combines the pulse width signal with the RPM signal from sensor 172 to provide an on/off pulse width control signal to the oscillator 196. A second input to oscillator 196 is provided from a reference source indicated as 144D through variable resistor 204 as a control signal to establish the frequency of oscillator 196 which provides the second input to And gate 192.

When both the variable oscillator 196 output and the maximum RPM comparator 180 output are in the same high state, then the output from the enabling And gate 192 wil also be high and if a difference or error signal is present at the damaged kernel subcircuit 124, an output from comparator 146 will result. The output will continue until the pulse-width times out, at which time the output is disabled, even if an error is still present. A new correction cannot be made until the oscillator 196 period recycles. During each succeeding cycle of oscillator 196 the process is repeated and if maximum RPM has not been exceeded and an error is present, a new correction will be made.

The comparator output enabling subcircuit 170 thus provides capability to refine the control capability of comparator 146. Note that the output of comparator 146 can normally be either high, off or low; that is, it is a three-state device. With the addition of enabling subcircuit 170, which is driven with a variable period and a variable on-to-off time ratio oscillator 196, the comparator 146 is capable of having a variable output. When this capability is combined with the control motor 82 that has a maximum actuation rate equal to or exceeding the fastest rate required to provide sufficient control for all dynamic conditions, any rate of control between zero and the maximum rate of the control motor can be approximated, in stepwise fashion, by controlling the frequency and the ratio of the On pulse width to Off pulse width. Also, such control of the frequency and the pulse width ratio may be done independently of the other. The amplitude of the error signal, that is, the greater the error, the greator the reaction.

As shown in FIG. 4, the output enabling subcircuit 170 is controlled by the operator-selected pulse width 200 and the frequency control 204 and by the speed of the rotor itself at 172. The system of FIG. 4 and the control motor 82 make a selected fixed RPM correction, such as 20 RPM or 50 RPM, to provide the necessary sensitivity of control regardless of the speed setting of the rotor 24. The system also allows the operator to select an upper RPM limit above which the control motor 82 is not able to drive the speed of the rotor 24. Further, to minimize speed changes, speed corrections are made only after long time intervals of five seconds or more, as set by appropriate time delay circuits, as is well known.

Briefly, the operation of the control circuit or system of FIG. 4 may be summarized as follows: The operator selects setting or dial of crop select 132 to a predetermined position for whatever crop is being harvested, and the setting or dial of damage level setpoint 132 to the amount of damage the operator will accept or tolerate. The circuit of FIG. 4 compares the number of pulses representative of the damaged kernels of grain to the settings set by the operator. If the number of damaged kernels is too high it will allow current to flow to electric motor 82 in a direction that slows down the rotor 24 to a prescribed number of RPMs. If the pulses representing the damaged kernels of grain is below a certain amount, motor 82 will speed up the rotor 24. The setting of the upper and lower limits is such that the rotor 24 will not be continually searching. Also, an upper limit override on rotor speed is provided.

Thus, the control circuit or system of FIG. 4 will continually set the harvesting combine to operate at the highest rotor speed without exceeding a certain grain damage level. This allows the rotor 24 to operate at its most efficient setting since it takes less power to thresh and move crop through a rotor operating at higher rotor speeds.

While the invention has been particularly shown and described with reference to a preferred embodiment thereof, it will be understood by those skilled in the art, that various changes in form and details may be made therein without departing from the spirit and scope of the invention.

What is claimed is:

1. In a crop harvesting combine comprising:
    a variable speed crop threshing mechanism for separating grain from the crop material;
    means for determining the ratio of damaged to undamaged grain received from said threshing mechanism;
    and control means for varying the speed of said threshing mechanism in response to changes effected in said ratio by said determining means, whereby the threshing mechanism is automatically speed-adjusted to maximum effective speed without exceeding a selected amount of damage to the grain in the threshing process.

2. The subject matter of claim 1 wherein said ratio determining means includes means for metering a predetermined amount of grain, and sieve means for separating and collecting the damaged grain from the predetermined amount.

3. The subject matter of claim 2 wherein said control means includes a transducer upon which the damaged grain impacts from said sieve means for converting the amount of damaged grain to an electronic impulse.

4. In a crop harvesting combine comprising:
    a crop threshing mechanism including a variable speed rotor for threshing and separating grain from the crop material;
    means for metering a predetermined amount of grain from the grain received from said threshing mechanism;
    sieve means for separating and collecting damaged grain from said predetermined amount;
    and control means responsive to the amount of damaged grain collected by said sieve means for varying the speed of said rotor, whereby the rotor may be driven at optimum speeds for minimum grain damage.

5. In a crop harvesting combine comprising:
    a crop threshing mechanism including a variable speed rotor for threshing and separating grain from the crop material;
    a grain conveying and collecting system including a hopper and a conveyor for moving grain into said hopper;
    a metering device proximate to said conveyor for diverting a predetermined amount of grain from the grain being conveyed to said hopper;
    a first sieve for receiving said predetermined amount of grain from said metering device and being sized to permit only damaged kernels of grain and fines to pass therethrough;
    a second sieve for receiving the damaged grain and fines from said first sieve and being sized to permit only the fines to pass therethrough, whereby said second sieve collects only the damaged grain;
    a transducer proximate to said second sieve upon which the damaged grain impacts to convert the amount of damage grain into electronic impulses;
    and a control system for adjusting the speed of said rotor in response to the number of impulses from said transducer whereby rotor speed is controlled to maximum effective speed without exceeding a selected tolerance of grain damage in the threshing process.

6. The subject matter of claim 5 wherein said control system includes means for pre-selecting a reference speed for said rotor.

7. The subject matter of claim 6 wherein said control system includes an electronic comparator for comparing the number of impulses from said transducer to the reference speed of said rotor to vary rotor speed from the reference speed in response to a predetermined differential measured by said comparator.

8. In a crop harvesting combine comprising:
    a variable speed crop threshing mechanism for separating grain from the crop material;
    damaged grain sensing means providing a variable output signal;
    and means for varying the speed of said threshing mechanism in response to the variable outlet signal from said damaged grain sensing means whereby the speed of operation of said threshing mechanism is automatically controlled to maximize effective speed without exceeding a selected amount of grain damage.

9. The subject matter of claim 8 wherein said means includes a transducer upon which damaged grain impacts for converting the amount of damaged grain to electronic impulses.

10. In a crop harvesting combine comprising:
    a variable speed crop processing device;

damaged grain sensing means providing a variable output signal;

and means for controlling said device in response to said variable output signal from said damaged grain sensing means whereby said device is moved at a selected rate to minimize crop damage during harvesting.

11. An apparatus as in claim 7 further including means for selectively providing a composite enabling signal for controlling the operation of said comparator whereby said comparator is permitted to operate only upon receiving said enabling signal.

12. An electronic control system such as for a crop harvesting combine, including a transducer for sensing the amount of damaged kernels of grain being processed within a selected period, means for providing a reference signal against which said damaged kernels of grain are compared and providing an output dependent on the amount of damaged kernels, comparator means for comparing the level of damaged kernels relative to a selected limit and providing an output representative thereof, a driven member, control motor means activatable in response to the output of said comparator means to drive said driven member to a maximum RPM without exceeding a selected amount of damaged kernels of grain.

13. Apparatus as in claim 12 further including an enabling subcircuit for receiving a signal representative of actual speed of the driven member, means for receiving a signal responsive to the maximum RPM limit of said driven member, means for combining said maximum RPM signal and said actual speed of said member to obtain a difference signal representative thereof, first reference signal providing means, means for comparing said difference signal with said first reference signal to provide an first enabling signal, means for providing a pulsed signal of selected pulse width, multiplier means for combining a signal representative of the actual RPM of said driven member with said pulse width signal to provide a pulse width control signal, oscillator means receiving said pulse width control signal as one input, means for providing a second reference signal as a second input to said oscillator to control the frequency of said oscillator whereby said oscillator provides a second enabling signal dependent on its two inputs, gate means to receive said first enabling signal from said comparing means and said second enabling signal from said oscillator to provide a composite enabling signal to said comparator whereby the comparator provides control capabilities for various dynamic conditions of said control motor dependent on controlling the frequency of the oscillator and pulse width signal, and dependent on the actual and maximum RPM of said driven member.

14. An apparatus as in claim 12 wherein said control means further include enabling means for selectively enabling said control means, said enabling means comprising means for receiving and comparing the actual RPM of said driven member with a maximum RPM limit for selectively providing a first enabling signal, means for providing a variable pulse width variable frequency for selectively providing a second enabling signal, gate means activated by said first and said enabling signals to provide a composite enabling signal to said comparator means to permit dynamic, stepped and variable control of said motor means and hence of said driven member.

15. An apparatus as in claim 1 wherein said control means include a crop select reference means for providing a reference signal dependent upon the type of grain crop being harvested, means for selecting the total amount of damaged kernels that may be tolerated within a selected period of time, multiplying means for combining the number of damaged kernels of grain with the signal representative of the type of crop being harvested to provide an output representative thereof, and means for summing said signal representative of the maximum number of damaged kernels that may be tolerated within a selected period of time with said output from said multiplier to provide an error or difference signal to be utilized by said control means.

* * * * *